United States Patent [19]

Nasiri

[11] 4,379,279
[45] Apr. 5, 1983

[54] SUBMERSIBLE PRESSURE TRANSDUCER PACKAGE

[75] Inventor: Saeed Nasiri, San Jose, Calif.

[73] Assignee: National Semiconductor Corporation, Santa Clara, Calif.

[21] Appl. No.: 287,487

[22] Filed: Jul. 27, 1981

[51] Int. Cl.³ .................................. H01L 10/10
[52] U.S. Cl. ........................................... 338/42
[58] Field of Search ............ 338/42, 36; 73/720, 73/721, 706

[56] References Cited

U.S. PATENT DOCUMENTS

| | | | |
|---|---|---|---|
| 4,135,408 | 1/1979 | DiGiovanni | 73/721 |
| 4,172,388 | 10/1979 | Gabrielson | 73/721 |
| 4,264,889 | 4/1981 | Yamamoto et al. | 338/42 |

Primary Examiner—C. L. Albritton
Attorney, Agent, or Firm—Brown & Martin

[57] ABSTRACT

A submersible pressure transducer package includes a housing having first and second separate chambers with a pressure responsive silicon transducer mounted in one of the chambers, an isolation fluid filling each chamber and sealed therein by means of a diaphragm with the separate bodies of fluid contacting separate portions of the pressure responsive silicon transducer with ports communicating working fluid pressure and ambient pressure to the bodies of fluid for transmittal thereof to the transducer.

4 Claims, 6 Drawing Figures

SUBMERSIBLE PRESSURE TRANSDUCER PACKAGE

BACKGROUND OF THE INVENTION

The present invention relates generally to pressure sensing transducers and pertains particularly to a universal package for submersible transducers.

Transducers for hostile environments, particularly submersible transducers, have been known and utilized for some time. These transducers are typically specially packaged for the particular environment and for measuring the particular type pressure of interest.

Due to the hostile environment from high corrosive fluids and the like, packages for measuring pressures in such environments are typically highly specialized and expensive. Such transducers are typically specially packaged for each particular application. This custom packaging makes the transducers rather expensive to manufacture as well as replace and/or repair.

These specially prepared transducers also are frequently limited in their application as well as pressure ranges. Silicon transducers are limited in their pressure range because of the fragility of the packaging.

It is therefore desirable that an improved universal submersible package by available.

SUMMARY AND OBJECTS OF THE INVENTION

It is therefore the primary object of the present invention to provide an improved submersible pressure transducer package.

In accordance with the primary aspect of the present invention a silicon transducer is mounted within a housing having separate bodies of isolation fluid contacting separate portions of the transducer for counteracting the pressures on the transducer chip and for transmitting separate pressures thereto.

BRIEF DESCRIPTION OF THE DRAWING

The above and other objects and advantages of the present invention will become apparent from the following description when read in conjunction with the drawings, wherein.

DETAILED DESCRIPTION OF PREFERRED EMBODIMENTS

Figure 1:
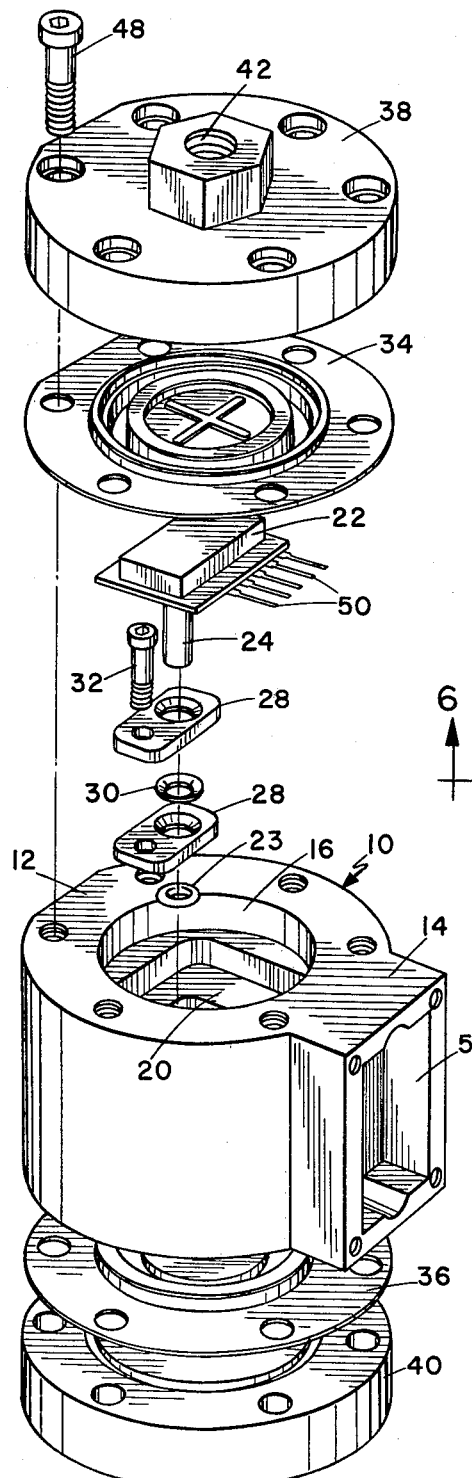
FIG. 1 is an exploded perspective view of the submersible pressure transducer assembly.

Turning to the drawings, the overall transducer assembly is best illustrated in FIG. 1 and designated generally by the numeral 10. The transducer assembly basically comprises a generally cylindrical housing 12 having a generally box-like boss or projection 14 extending from one side thereof having a box-like cavity for sealingly accommodating the connection of electrical leads as will be explained. The housing is of a generally cylindrical configuration and includes first and second generally cylindrical cavities or chambers 16 and 18 disposed generally coaxially of the housing. The chamber 16 is provided with a recessed cavity 20 for receiving a silicon pressure transducer 22 which is of the type described for example in U.S. Pat. No. 3,909,924 entitled "A Method of Fabrication of Silicon Pressure Transducer Sensor Units" and assigned to National Semiconductor Corporation, Santa Clara, Calif., assignee of the present application. The disclosure of this patent is incorporated herein by reference.

Transducers of this type are available from the National Semiconductor Corporation, Santa Clara, Calif. under various part number designations and known as an active trimmed LX16XXG Series Hybrid Pressure Transducer. These transducers are also described in the National Semiconductor Corporation Pressure Transducer Handbook. These transducers have various configurations and basically comprise a single crystal silicon sensor with supporting circuit components mounted on a ceramic substrate with a conventional hybrid IC. The silicon sensor may respond to either positive or negative pressure and includes a reference pressure cavity which encloses a vacuum in absolute transducers or is open by an alternate inlet for gage or differential transducers. With minor circuit modifications for the differential and backward gauge versions and with inclusion of appropriate pressure ports, the same basic transducer can serve for all three basic pressure measurements.

This basic transducer structure is incorporated in the housing of the present assembly and is mounted within what will be referred to as the low differential pressure chamber with its interior communicating by means of a port tube 24 with the high differential pressure chamber 18. The tube or port 24 is bonded directly to the package 22 and extends through a bore or port opening 26 into chamber 18 and is sealed by an O-ring 23 or the like and retained in position by means of a retainer assembly including a pair of retainer brackets 28, between which is disposed a retaining washer 30 for gripping the outer surface of the tube 24. These plates are held in place by a suitable cap screw or the like 32.

The chamber 16 is provided with a recess for receiving the package 22 and is compensated such that the volume of this chamber equals that of chamber 18. With equal volumes, an equal body or volume of isolation fluid may be placed in each of the chambers with this equal volume serving to thermally isolate the transducer chip or device 22 from the results of temperature changes in the environment. Each of the chambers 16 and 18 is respectively sealed hermetically by means of a diaphragm 34 and 36 each having a double roll to assure equal pressure response or movement in both directions of movement thereof. These diaphragms are clamped and held into position by means of identical end plates 38 and 40, each having a port 42 and 44, respectively, for communicating working fluid or ambient fluid to the respective chambers. The caps 38 and 40 are held in place by a plurality of cap screws 48.

Figure 2:
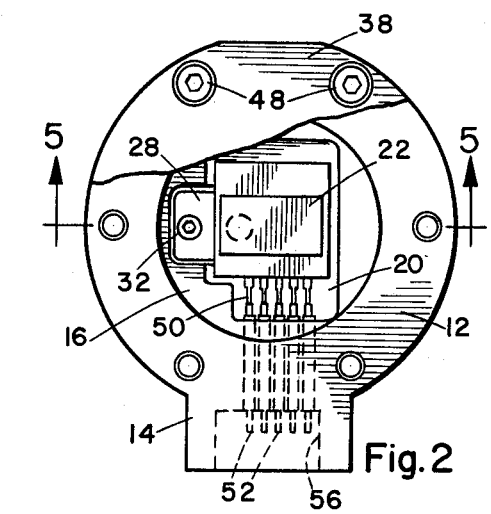
FIG. 2 is a top plan view of the assembled unit with a portion of the top cover cut away.
Figure 3:
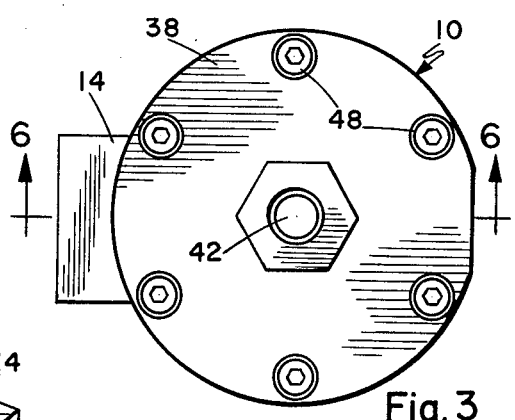
FIG. 3 is a complete top plan view of the assembled unit.
Figure 4:
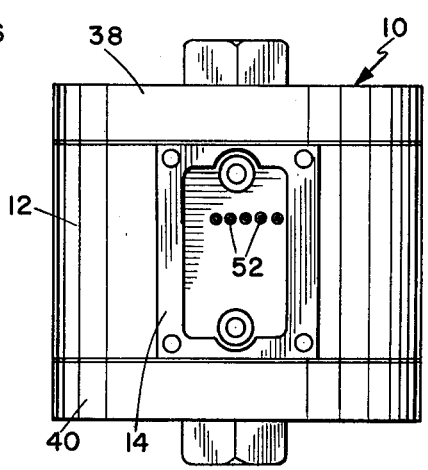
FIG. 4 is a front elevation view of the unit.
Figure 6:
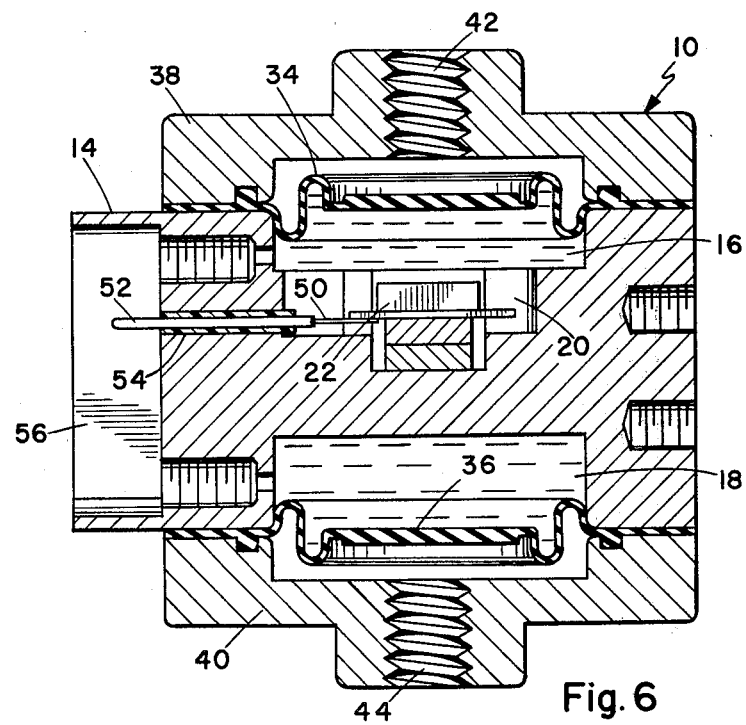
FIG. 6 is an enlarged sectional view taken on line 6—6 of FIG. 3.

As best seen in FIGS. 2 and 6 the electronic package 22 communicates electrically to the exterior of the housing by means of a plurality of conducting leads 50 which are connected to a plurality of leads 52 extending through and bonded by means of an epoxy or the like 54 into bores within the wall of the housing 12. These leads then may be connected within the chamber 56 of the box-like structure 14 and thereby hermetically seal the electronic sections or electrical leads from the surrounding environment.

Figure 5:
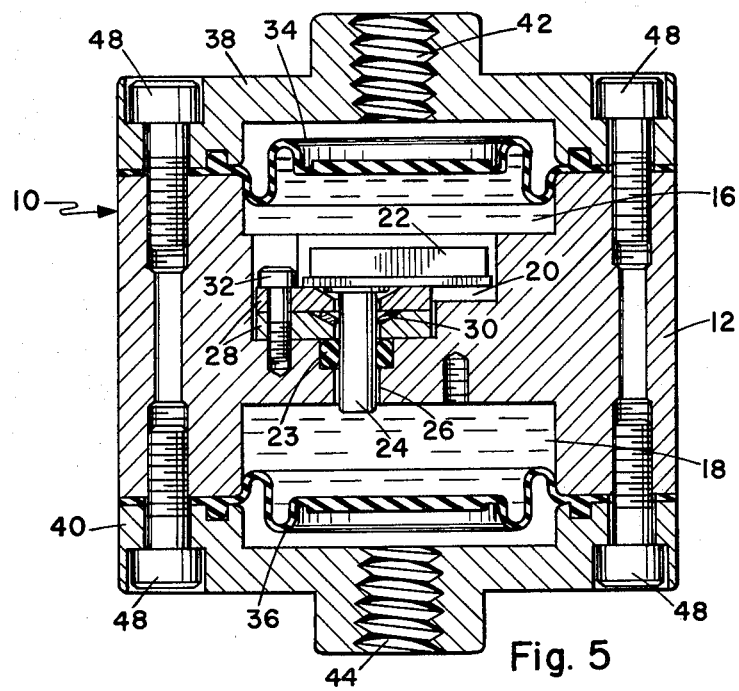
FIG. 5 is an enlarged sectional view taken on line 5—5 of FIG. 2.

The housing 12 may be constructed of any number of suitable materials to suit the environmental conditions under which the transducer is to operate. The housing for example may either be nylon, die-cast aluminum, brass, stainless steel or other suitable materials. The isolation fluid within the chambers 16 and 18 may be any nondetergent inert fluid, but is preferably a de-gassed silicon oil which serves to completely isolate the silicon transducer 22 from ambient atmosphere or pressure and working fluid. In the illustrated embodiment, as best seen in FIG. 5 for example, the working fluid would communicate by way of port 44 with the diaphragm 36. The diaphragm 36 is preferably of a tough compliant corrosion resistant material to withstand the temperature, pressure and other environmental conditions. Suitable materials such as compliant stainless steel, or a suitable polymer such as those sold under the marks Neoprene and Nitrile are preferred for the isolation diaphragms.

The transducer 22 is selected to provide the desired type pressure monitoring such as absolute pressure, gauge pressure, or differential pressure. Absolute pressure is generally defined as pressure of a liquid or gas measured relative to a vacuum (zero pressure). Gauge pressure is generally defined as a differential pressure measurement using ambient pressure as a reference. Alternatively gauge pressure is defined as a pressure in excess of a standard atmosphere at sea level (i.e., 14.7 psi). Differential pressure is defined as the difference in pressure between two pressures or alternately the difference between a reference pressure and a measured value of a pressure. Various transducers may be selected to measure the various pressures and suitably packaged within the package or housing assembly as above described.

In the illustrated embodiment, the package or transducer 22 is located within the low pressure chamber 16 with the isolation fluid therein contacting the low pressure side of the transducer 22. The high pressure port or fluid in chamber 18 communicates by way of the high pressure port or tube 24 to the high pressure portion of the transducer 22. The transducer 22 is thus completely surrounded and contacted by isolation fluids. This provides a total isolation of the transducer itself from the working environment and the ambient environment.

Thus while I have illustrated and described my invention by means of specific embodiments, it is to be understood that numerous changes and modifications may be made therein without departing from the spirit and scope of the invention as defined in the appended claims.

Having described my invention, I now claim:

1. A submersible pressure transducer comprising in combination:
   a generally cylindrical housing having first and second substantially cylindrical chambers formed in opposite ends therein and disposed coaxially of said housing;
   a cylindrical bore communicating between said chambers;
   a pressure responsive silicon transducer chip mounted in a fixed position in a first one of said chambers and having first a portion subject to pressure in said first chamber and a second portion thereof communicating via said bore and subject to pressures in said second chamber;
   a diaphragm sealingly closing each of said chambers;
   a separate body of isolation fluid of substantially equal volumes filling each of said chambers and contacting a respective one of said first and second portions of said transducer chip; and
   first and second pressure ports for communicating a reference fluid and a pressure fluid to a respective one of said diaphragms for establishing a responsive pressure on said transducer chip.

2. The pressure transducer of claim 1, wherein said isolation fluid is a de-gassed silicon oil, and
   said diaphragms are Nitrile.

3. The pressure transducer of claim 2 including:
   a lead connection cavity formed in one side of said housing, and a plurality of electrical conductor leads extending through the walls of said housing from said lead connection cavity into said one of said chambers.

4. The pressure transducer of claim 1 wherein said silicon chip includes an elongated tubular means communicating with the isolation fluid in said high pressure chamber via said cylindrical bore.

* * * * *